United States Patent
Fu et al.

(10) Patent No.: US 8,837,475 B2
(45) Date of Patent: Sep. 16, 2014

(54) METHOD FOR CONTROLLING AREA BOUNDARY, METHOD AND SYSTEM FOR ESTABLISHING CONNECTION IN MULTILAYER NETWORK

(75) Inventors: Xihua Fu, Shenzhen (CN); Xuefeng Lin, Shenzhen (CN); Gang Xie, Shenzhen (CN); Xinling Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 61 days.

(21) Appl. No.: 13/509,333

(22) PCT Filed: Apr. 1, 2010

(86) PCT No.: PCT/CN2010/071501
§ 371 (c)(1),
(2), (4) Date: May 11, 2012

(87) PCT Pub. No.: WO2010/148695
PCT Pub. Date: Dec. 29, 2010

(65) Prior Publication Data
US 2012/0230330 A1   Sep. 13, 2012

(30) Foreign Application Priority Data
Nov. 12, 2009   (CN) ............................. 200910221821

(51) Int. Cl.
*H04L 12/56* (2006.01)
*H04L 12/717* (2013.01)
*H04L 12/721* (2013.01)

(52) U.S. Cl.
CPC ............... *H04L 45/42* (2013.01); *H04L 45/68* (2013.01)

USPC .......................................................... 370/389

(58) Field of Classification Search
CPC ....... H04L 45/00; H04L 47/10; H04L 49/351; H04L 29/06; H04L 29/0653
USPC ........................................ 370/389, 473, 474
See application file for complete search history.

(56) References Cited

U.S. PATENT DOCUMENTS 7,526,492 B2 * 4/2009 Mikuriya et al. ............. 701/454
7,606,203 B1 * 10/2009 Shabtay et al. ............... 370/332

(Continued)

FOREIGN PATENT DOCUMENTS

| CN | 101001200 A | * 7/2007 | ............ H04L 12/56 |
|---|---|---|---|
| CN | 101335692 A | 12/2008 | |
| CN | 101552717 A | 10/2009 | |

OTHER PUBLICATIONS

Path Computation Element Communication Protocol (PCEP), IETF, Vasseur, Le Roux, RFC 5440, Mar. 2009.*

(Continued)

*Primary Examiner* — Mark Rinehart
*Assistant Examiner* — Peter Solinsky
(74) *Attorney, Agent, or Firm* — Brooks Kushman P.C.

(57) ABSTRACT

A method for controlling area boundary, and a method and system for establishing connection in a multilayer network are provided. With a Path Computation Element (PCE) computing a network path and sending response message carrying layer boundary information to a Path Computation Client (PCC), in the present invention, a multilayer network connection can be established rapidly, thereby reducing the time for establishing the multilayer network connection.

14 Claims, 4 Drawing Sheets

(56) References Cited

U.S. PATENT DOCUMENTS

| | | | |
|---|---|---|---|
| 7,664,108 B2 * | 2/2010 | Bahattab | 370/389 |
| 7,701,940 B2 * | 4/2010 | Novello et al. | 370/390 |
| 7,729,347 B2 * | 6/2010 | Rosberg | 370/389 |
| 7,808,972 B2 * | 10/2010 | Zhang | 370/351 |
| 7,894,432 B2 * | 2/2011 | Rana et al. | 370/392 |
| 7,978,622 B2 * | 7/2011 | Zhang | 370/252 |
| 8,009,669 B2 * | 8/2011 | Lee | 370/389 |
| 8,064,447 B2 * | 11/2011 | Chen et al. | 370/390 |
| 8,111,627 B2 * | 2/2012 | McCallum et al. | 370/248 |
| 8,127,129 B2 | 2/2012 | Chen | |
| 8,238,334 B2 * | 8/2012 | Dunbar et al. | 370/389 |
| 8,270,317 B2 * | 9/2012 | Xia et al. | 370/254 |
| 8,369,213 B2 * | 2/2013 | Vasseur et al. | 370/228 |
| 8,565,088 B1 * | 10/2013 | Mukerji et al. | 370/235 |
| 2005/0036501 A1 * | 2/2005 | Chung et al. | 370/401 |
| 2005/0201343 A1 * | 9/2005 | Sivalingham et al. | 370/338 |
| 2005/0213591 A1 * | 9/2005 | Nakazawa et al. | 370/401 |
| 2006/0259608 A1 * | 11/2006 | Kim et al. | 709/223 |
| 2007/0198735 A1 * | 8/2007 | Kim et al. | 709/230 |
| 2009/0010201 A1 * | 1/2009 | Kawakami | 370/328 |
| 2009/0228604 A1 * | 9/2009 | Miyazaki | 709/238 |
| 2012/0069844 A1 * | 3/2012 | Aggarwal et al. | 370/390 |

OTHER PUBLICATIONS

Requirements for GMPLS-Based Multi-Region and Multi-Layer Networks (MRN/MLN), IETF RFC 5212, Shiomoto, Papadimitriou, Le Roux, Vigoureux, Brungard, Jul. 2008.*

MPLS Configuration on Cisco IOS Software, Chapters 1, 7, and 11, Lobo, Lakshman, 2006.*

Multiprotocol Label Switching Architecture, IETF RFC 3031, Rosen, Viswanathan, Callon, Jan. 2001.*

LDP Specification, IETF RFC 5036, Andersson, Minei, Thomas, Oct. 2007.*

RFC 5440, Mar. 2009.*

MPLS Configuration on Cisco IOS Software, 2006.*

International Search Report for PCT/CN2010/071501, English Translation attached to Original, Both Completed by the Chinese Patent Office on Jul. 16, 2010, All together 6 Pages.

* cited by examiner

METHOD FOR CONTROLLING AREA BOUNDARY, METHOD AND SYSTEM FOR ESTABLISHING CONNECTION IN MULTILAYER NETWORK

CROSS-REFERENCE TO RELATED APPLICATION

This application is the U.S. national phase of PCT Appln. No. PCT/CN2010/071501 filed Apr. 1, 2010 which claims priority to Chinese Application No. 200910221821.7 filed Nov. 12, 2009, the disclosures of are incorporated in their entirety by reference herein.

TECHNICAL FIELD

The present invention relates to the field of communications, and more especially, to a method for controlling area boundary, and a method and system for establishing a connection in a multilayer network.

BACKGROUND OF THE RELATED ART

As shown in FIG. 1, the existing process when establishing a connection in a multilayer network is as follows:

(1) after an intermediate node receives path message, it judges whether it is located on the area boundary of a Label Switch Path (LSP) or not according to explicit route object (ERO) carried in the path message and the locally saved route database information.

(2) if it is located on the area boundary, it also needs to determine another boundary node in this area according to the ERO and the route database information.

(3) according to the two determined boundary nodes, the low-layer network route information located between the two boundary nodes is extracted from the ERO.

(4) the first node on the area boundary triggers a low-layer network signaling to establish a new forwarding adjacency LSP (FA-LSP) so as to form a Forwarding Adjacency (FA) relationship between the area boundary nodes. Alternatively, the already existing forwarding adjacency relationship located between the area boundary nodes can be used, without the need of triggering the low-layer network signaling.

(5) After there exists the forwarding adjacency relationship between the area boundary nodes, the process of establishing the signaling in this layer continues.

In accordance with the prior art, in the case of no cooperation with the virtual network topology manager (VNTM) or no configuration of the appropriate strategy, the area boundary node must determine the area boundary based on the route database saved by it and the ERO object carried in the signaling and according to the algorithm provided in the standard RFC4206.

There are some foreseeable scenarios: traffic engineering databases (known as TED or the IGP database) are centralized to be managed, for example, the route database only exists in a node running the Path Computation Element (PCE), other nodes do not have route databases. Therefore if an intermediate node does not have a route database, it is not able to determine the area boundary in the process of sending the signaling.

SUMMARY OF THE INVENTION

The technical problem to be solved in this invention is to propose a method for controlling area boundary, a method and system for establishing a connection in a multilayer network, to solve the problem that a multilayer network connection cannot be established when there is no route database information saved in a node, moreover, even if there is route database information saved in the node, the present invention can also reduce the time for establishing the multilayer network connection.

In order to solve the aforementioned technical problem, the present invention provides a method for controlling area boundary in a multilayer network, comprising:

a path computation client (PCC) sending request message for computing a network route to a path computation element (PCE);

the PCE computing the network path, returning response message to the PCC, wherein the response message carries layer boundary information which comprises information of one or more pairs of area boundary nodes or is empty.

After the step of the PCE returning the response message to the PCC, the method also comprises:

in the process of the PCC establishing a connection with the peer-end node, the layer boundary information is carried in the path message sent by the PCC to the intermediate node, as well as in the path message sent between the intermediate nodes.

The layer boundary information comprising the information of one or more pairs of area boundary nodes refers to that:

the layer boundary information comprises the information of one or more pairs of area boundary nodes in the same layer, or the information of one or more pairs of area boundary nodes in multiple layers.

In order to solve the aforementioned technical problem, the present invention provides a method for establishing a connection in a multilayer network, comprising:

a path computation client (PCC) sending request message for computing a network route to the peer-end node to a path computation element (PCE);

the PCE computing the network path, returning response message to the PCC, wherein the response message carries the path information and the layer boundary information of the multilayer network;

according to the path information and the layer boundary information in the received response message, the PCC sending the path information to an intermediate node, and, according to the path information and the layer boundary information in the received response message, the intermediate node further sending the path message to another intermediate node or its peer-end node;

wherein, the layer boundary information comprises the information of one or more pairs of the area boundary nodes or is empty.

In the step of the intermediate node further sending the path message to the other intermediate node or its peer-end node according to the received path message, if the layer boundary information carried in the path message received by the intermediate node is empty, it is to continue the process of establishing the network connection in the local layer according to the path information in the path message; if it is not empty, it is to judge whether the first node in the received layer boundary information is the local node or not; if it is not the local node, it is to continue the process of establishing the network connection in this layer according to the path information in the path message; if it is the local node, the local node is the first node on the area boundary, it is to acquire the second node from the layer boundary information as the end node on the area boundary;

after determining a pair of area boundary nodes, the first node on the area boundary acquires the path information of the low-layer network between the pair of the area boundary nodes from the received path information, and acquires the layer boundary information of the low-layer network according to the path information of the low-layer network and the received layer boundary information, initiates a process of establishing a low-layer network connection; after the low-layer network connection is established, the first node on the area boundary continues the process of establishing a network connection in the local layer according to the path information and the layer boundary information in the received path message.

In the step of the first node on the area boundary acquiring the path information of the low-layer network between the pair of the area boundary nodes from the received path information, if the acquired path information is empty, and there is no connection between the area boundary nodes, the first node on the area boundary sending request message for computing the low-layer network route between two area boundary nodes to the PCE which is responsible for computing the low-layer network path;

the PCE, which is responsible for the low-level network path computation, computing the network path, returning response message to the first node on the area boundary, wherein the response message carries the path information and the layer boundary information of the low-layer network.

the layer boundary information comprising the information of one or more pairs of area boundary nodes refers to that:

the layer boundary information comprises the information of one or more pairs of area boundary nodes in the same layer, or the information of one or more pairs of area boundary nodes in multiple layers.

In order to solve the aforementioned technical problem, the present invention provides a system for establishing a connection in a multilayer network, comprising a path computation client (PCC), a path computation unit (PCE), one or more intermediate nodes and a peer-end node, wherein:

the PCC is set to send request message for computing a network route to a peer-end node to the PCE, as well as, send the path information to the intermediate nodes according to the path information and the layer boundary information in the received response message;

the PCE is set to compute the network path, return response message to the PCC, wherein the response message carries the path information and the layer boundary information of the multilayer network;

the intermediate nodes are set to further send the path message to other intermediate nodes or the peer-end node according to the path information and the layer boundary information in the received path message;

wherein, the layer boundary information comprises the information of one or more pairs of the area boundary nodes or is empty.

The intermediate nodes are further set to judge whether the layer boundary information in the received path information is empty or not, if it is empty, continue the process of establishing the network connection in this layer according to the path information in the path message; otherwise, judge whether the first node in the received layer boundary information is the local node or not; if it is not the local node, continue the process of establishing the network connection in this layer according to the path information in the path message, if it is the local node, with the node being the first node on the area boundary, acquire the second node from the layer boundary information as the end node on the area boundary, after determining a pair of area boundary nodes, acquire the path information of the low-layer network between the pair of area boundary nodes from the received path information, and acquire the layer boundary information of the low-layer network according to the path information of the low-layer network and the received layer boundary information, and initiate a process of establishing a low-layer network connection; after the low-layer network connection is established, continue the process of establishing a network connection in the local layer according to the path information and the layer boundary information in the received path message.

The intermediate nodes are further set to: when acquiring the path information of the low-layer network between the pair of area boundary nodes from the received path information, if the acquired path information is empty and there is no connection between the area boundary nodes, send request message for computing the low layer network route between two area boundary nodes to the PCE which is responsible for computing the low layer network path; and initiate a low-layer network connection establishment process according to the path information and the layer boundary information of the low-layer network in the response message received by the PCE which is responsible for computing the low-layer network path.

In order to solve the aforementioned technical problem, the present invention provides a path computation element (PCE) for supporting connection establishment in a multilayer network, comprising a receiving module, a computing module and a transmitting module that are cascaded;

said receiving module is set to receive request message for computing a network route sent by a path computation client (PCC);

the computing module is set to compute the network path according to the request message received by the receiving module, and generate response message; wherein the response message carries the layer boundary information, and the layer boundary information comprises the information of one or more pairs of the area boundary nodes or is empty;

the transmitting module is set to return the response message generated by the computing module to the PCC.

The present invention solves the problem that a multilayer network connection cannot be established when the route database information is not saved in the node, moreover, with the present invention, even if the node stores the route database information, the area boundary can be controlled with the method provided in the present invention without the need of the local route database information, a multilayer network connection can be established quickly, thereby reducing the time for establishing the multilayer network connection.

PREFERRED EMBODIMENTS OF THE PRESENT INVENTION

Figure 1:
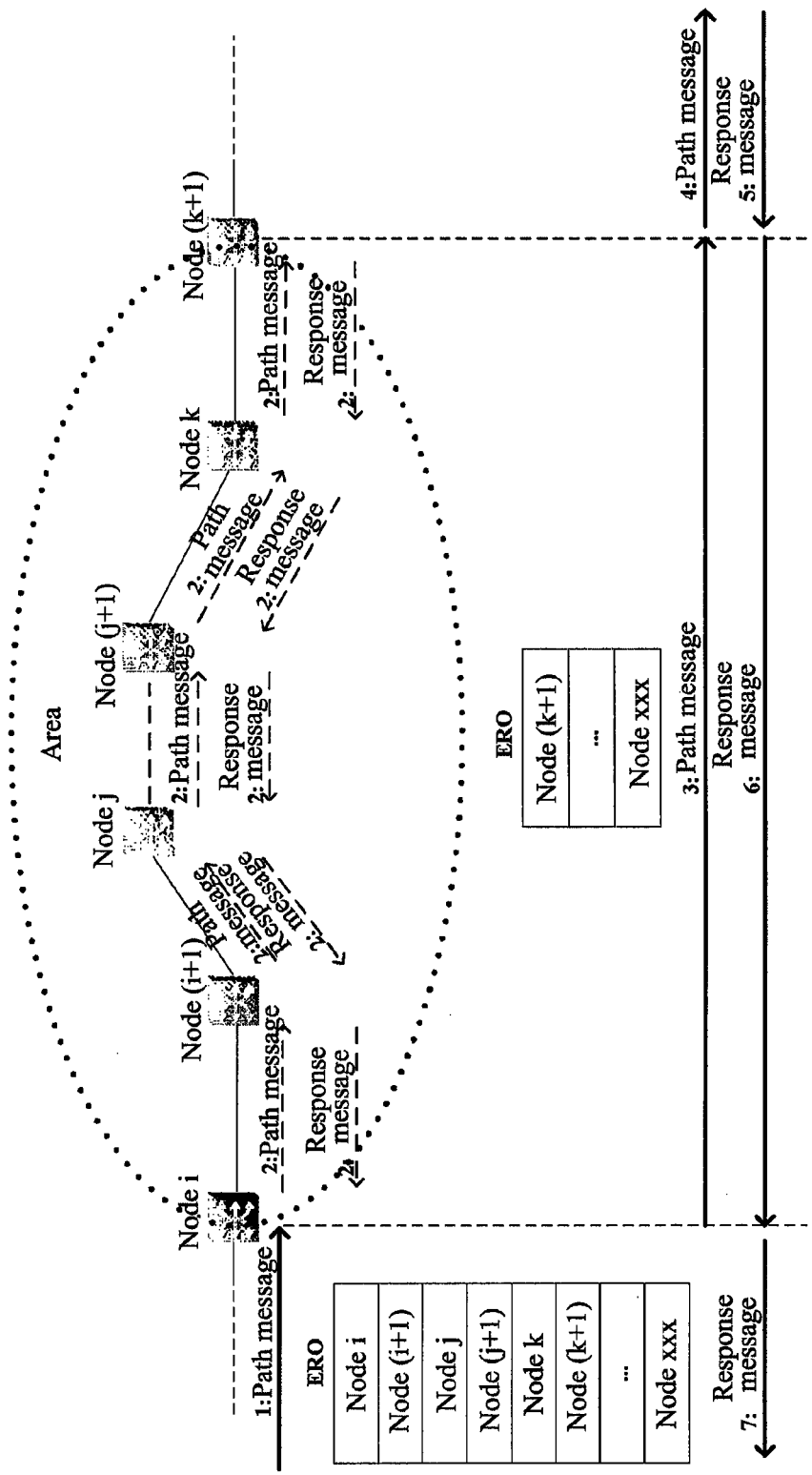
FIG. 1 is a diagram of establishing a connection in a multilayer network in the prior art.

The prior art can assist in this technical solution, in the path computation process, the PCE can determine the layer boundary, and the response (PCRep) returned by the PCE to the PCC (Path Computation Client) carries the ERO object to indicate the route of the multilayer network, and the ERO object is carried in the path message in the process of establishing a multilayer network connection.

The basic idea of the present invention is: the PCE determining the layer boundary information, wherein the layer boundary information is carried in the PCRep returned back to the PCC. And, the path message also carries the layer boundary information.

Specifically, the PCC sends request message for computing a network path (PCReq) to the PCE; the PCE computes the network path and returns response message to the PCC, wherein said response messages carries the boundary information which comprises the information of one or more pairs of area boundary nodes or is empty.

In the process of the PCC establishing a connection with the peer-end node, the layer boundary information is carried in the path message sent by the PCC to the intermediate nodes, as well as in the path message sent between the intermediate nodes.

The layer boundary information comprising the information of one or more pairs of area boundary nodes refers to:

the layer boundary information comprises the information of one or more pairs of area boundary nodes in the same layer, or the information of one or more pairs of area boundary nodes in multiple layers.

Specifically, a new object (there is no limit about how to name the object) might be defined, the format definition of the object is the same as the ERO; the new object carries the layer boundary information, and the new object is carried in the response message sent by the PCE to the PCC, the path message sent by the PCC to the intermediate nodes, as well as the path message sent between the intermediate nodes.

For example, the object is named as ERBO—Explicit Region Boundary Object.

(1) the definition of the extended PCRe message is as follows:

```
<PCRep Message>::=<Common Header>
       <response-list>
<response-list>::=<response>[<response-list>]
<response>::=<RP>
    [<NO-PATH>]
    [<attribute-list>]
    [<path-list>]
<path-list>::=<path>[<path-list>]
<path>::= <ERO>[<ERBO>]<attribute-list>
<attribute-list>::=[<LSPA>] [<BANDWIDTH>] [<metric-list>] [<IRO>]
<metric-list>::=<METRIC>[<metric-list>]
```

(2) the definition of the extended path message is as follows:

```
<Path Message> ::= <Common Header> [ <INTEGRITY> ]
    [[<MESSAGE_ID_ACK>
<MESSAGE_ID_NACK>] ... ]
    [ <MESSAGE_ID> ]
    <SESSION> <RSVP_HOP>
    <TIME_VALUES>
    [ <EXPLICIT_ROUTE> ]
    [ < ERBO > ]
    <LABEL_REQUEST>
    [ <PROTECTION> ]
    [ <LABEL_SET> ... ]
    [ <SESSION_ATTRIBUTE> ]
    [ <NOTIFY_REQUEST> ]
    [ <ADMIN_STATUS> ]
    [ <POLICY_DATA> ... ]
    <sender descriptor>
<sender descriptor> ::= <SENDER_TEMPLATE> <SENDER_TSPEC>
    [ <ADSPEC> ]
    [ <RECORD_ROUTE> ]
    [ <SUGGESTED_LABEL> ]
    [ <RECOVERY_LABEL> ]
    <UPSTREAM_LABEL>
```

The method for establishing a connection in the multilayer network in accordance with an embodiment of the present invention comprises:

the PCC sends request message for computing a network route to a peer-end node to the PCE;

the PCE computes the network path, returning response message to the PCC, wherein the response message carries the path information and the layer boundary information of the multilayer network;

the PCC sends the path message to the intermediate nodes according to the received path information and the layer boundary information, and, the intermediate nodes further sends the path message to other intermediate nodes or the peer-end node according to the path information and the layer boundary information in the received path message;

wherein the layer boundary information comprises the information of one or more pairs of the area boundary nodes or is empty;

wherein, the path information is included in the ERO. A new object can be defined, and the layer boundary information is contained in the new object.

Preferably, in the path message received by the intermediate nodes, if the carried layer boundary information is empty, it is to continue the process of establishing a network connection in the local layer according to the path information in the path message; if the carried layer boundary information is not empty, it is to judge whether the first node in the received layer boundary information is the local node or not; if it is not the local node, it is to continue the process of establishing a network connection in the local layer according to the path information in the path message, if it is the local node, the local node is the first node on the area boundary, it is to acquire the second node from the layer boundary information as the end node on the area boundary; after a pair of area boundary nodes is determined, the first node on the area boundary acquires the path information of the low-layer network between the pair of area boundary nodes from the received path information, and acquires the layer boundary information of the low-layer network according to the path information of the low-layer network and the received layer boundary information, initiates a process of establishing the low-layer network connection. After another node in the low-layer network receives the path message, it also performs the aforementioned steps. After the low-layer network connection is established, the first node on the regional boundary continues the process of establishing the network connection in the local layer according to the path information and the layer boundary information in the received path message.

The step of the first node on the area boundary acquiring the layer boundary information of the low-layer network according to the path information of the low-layer network and the received layer boundary information specifically comprises:

if some layer boundary information left by the newly defined object received by the first node on the area boundary node exists in the acquired path information of the low-layer network, a new object is generated, the layer boundary information is put into the newly defined object as the layer boundary information of the low-layer network, and is carried in the path message which is sent to the low-layer network.

Preferably, in the step of the first node on the area boundary acquiring the path information of the low-layer network between the area boundary nodes from the received path information, if the acquired path information is empty and there is no connection between the area boundary nodes, the first node on the area boundary sends request message for computing the low-layer network route between two area boundary nodes to the PCE which is responsible for computing the low-layer network path; the PCE which is responsible for the low-level network path computation computes the network path, returns response message to the first node on the area boundary, wherein the response message carries the path information and the layer boundary information of the low-layer network. After the other nodes in the low-layer network receive the path message, they also perform the aforementioned steps.

The system for establishing a connection in a multilayer network in accordance with an embodiment of the present invention comprises the PCC, the PCE, one or more intermediate nodes and a peer-end node, the PCC is set to send request message for computing the network route to the peer-end node to the PCE, as well as send the path information to the intermediate nodes according to the path information and the layer boundary information in the received response message;

the PCE is set to compute the network path, return response message to the PCC, wherein the response message carries the path information and the layer boundary information of the multilayer network;

the intermediate nodes are set to further send the path message to other intermediate nodes or the peer-end node according to the path information and the layer boundary information in the received path message;

wherein, the layer boundary information comprises the information of one or more pairs of the area boundary nodes or is empty.

Preferably, the intermediate nodes are further set to judge whether the layer boundary information in the received path message is empty or not, if it is empty, continue the process of establishing network connection in this layer according to the path information in the path message; if it is not empty, judge whether the first node in the received layer boundary information is the local node or not; if the first node is not the local node, continue the process of establishing the network connection in the local layer according to the path information in the path message, if the first node is the local node, with the node being the first node on the area boundary, acquire the second node from the layer boundary information as the end node on the area boundary, after determining a pair of area boundary nodes, acquire the path information of the low-layer network between the pair of the area boundary nodes from the received path information, meanwhile, if some layer boundary information left by the newly defined object exists in the extracted path information, generate a new object, put the layer boundary information into the newly defined object and carry the object into the path message; the boundary node acquires the layer boundary information of the low-layer network according to the path information of the low-layer network and the received layer boundary information, and initiates a process of establishing a low-layer network connection; after the low-layer network connection is established, it is to continue the process of establishing the network connection in the local layer according to the path information and the layer boundary information in the received path message.

The intermediate node is further set to: when the intermediate node is the first node on the area boundary, if the received some layer boundary information left by the newly defined object exists in the acquired path information of the low-layer network, generate a new object, put the layer boundary information into the newly defined object as the layer boundary information of the low-layer network and carry the object into the path message which is sent to the low-layer network.

Preferably, the intermediate nodes are further set to: when acquiring the path information of the low-layer network between the pair of the area boundary nodes from the received path information, if the acquired path information is empty and there is no connection between the area boundary nodes, send request message for computing the low layer network route between two area boundary nodes to the PCE which is responsible for computing the low layer network path; and initiate a process of establishing the low-layer network connection according to the path information and the layer boundary information of the low-layer network in the response message received by the PCE which is responsible for computing the low-layer network path.

The path computation element (PCE) in the embodiment of the present invention a receiving module, a computing module and a transmitting module that are cascaded;

said receiving module is set to receive request message for computing a network route sent by a path computation client (PCC);

the computing module is set to compute the network path according to the request message received by the receiving module, and generate response message; wherein the response message carries the layer boundary information, and the layer boundary information comprises the information of one or more pairs of the regional boundary nodes or is empty;

the transmitting module is set to return the response message generated by the computing module to the PCC.

In the following, the present invention will be described in further detail with combination of the accompanying drawings and specific examples.

The First Application Example

Figure 2:
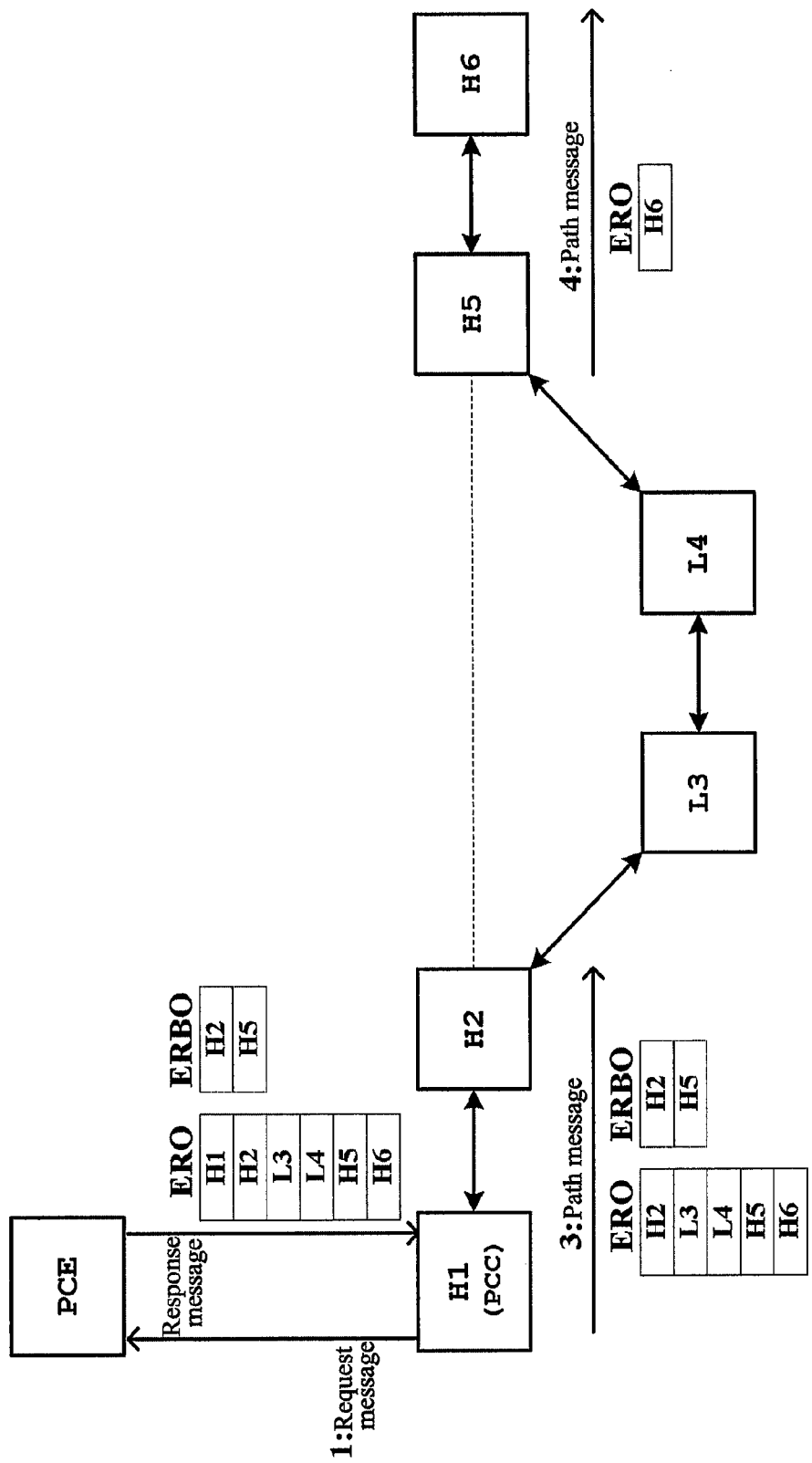
FIG. 2 is a diagram of establishing a connection in a multilayer network in accordance with the first application example of the present invention.

As shown in FIG. 2, in the architecture of the single PCE controlling the multi-layer network, the specific implementation steps for establishing a connection in a multilayer network are as follows:

(1) the H1 sends a request to the PCE to request to compute the multilayer network route between the HI and the H6, after the PCE computes the route successfully, ERO={H1, H2, L3, L4, H5, H6}, ERBO={H2, H5} is carried in the PCRep message.

(2) the H1 sends Path message to the H2, and the message caries ERO={H2, L3, L4, H5, H6}, ERBO={H2, H5}.

(3) after the H2 receives the Path message, the H2 determines that the local node is a starting point, i.e. the first node, on the area boundary according to the ERO object and the ERBO object, meanwhile, the end node on the area boundary is H5, the extracted low-layer network route information is H2, L3, L4 and H5.

(4) the H2 initiates a low-layer network signaling to establish a low-layer network connection with the route being H2, L3, L4 and H5.

(5) after the low-layer network connection is established successfully, it is to continue the process of establishing high-layer network connection, the H2 sends Path message to the H5, meanwhile the carried ERO object should cut the route information (L3, L4) of the low-layer network; at the same time, the ERBO also needs to cut the used layer boundary nodes (the H2 and the H5).

(6) the H5 sends the Path message to the H6, and the Path message carries the ERO={the H6}, the ERBO which is empty.

The Second Application Example

Figure 3:
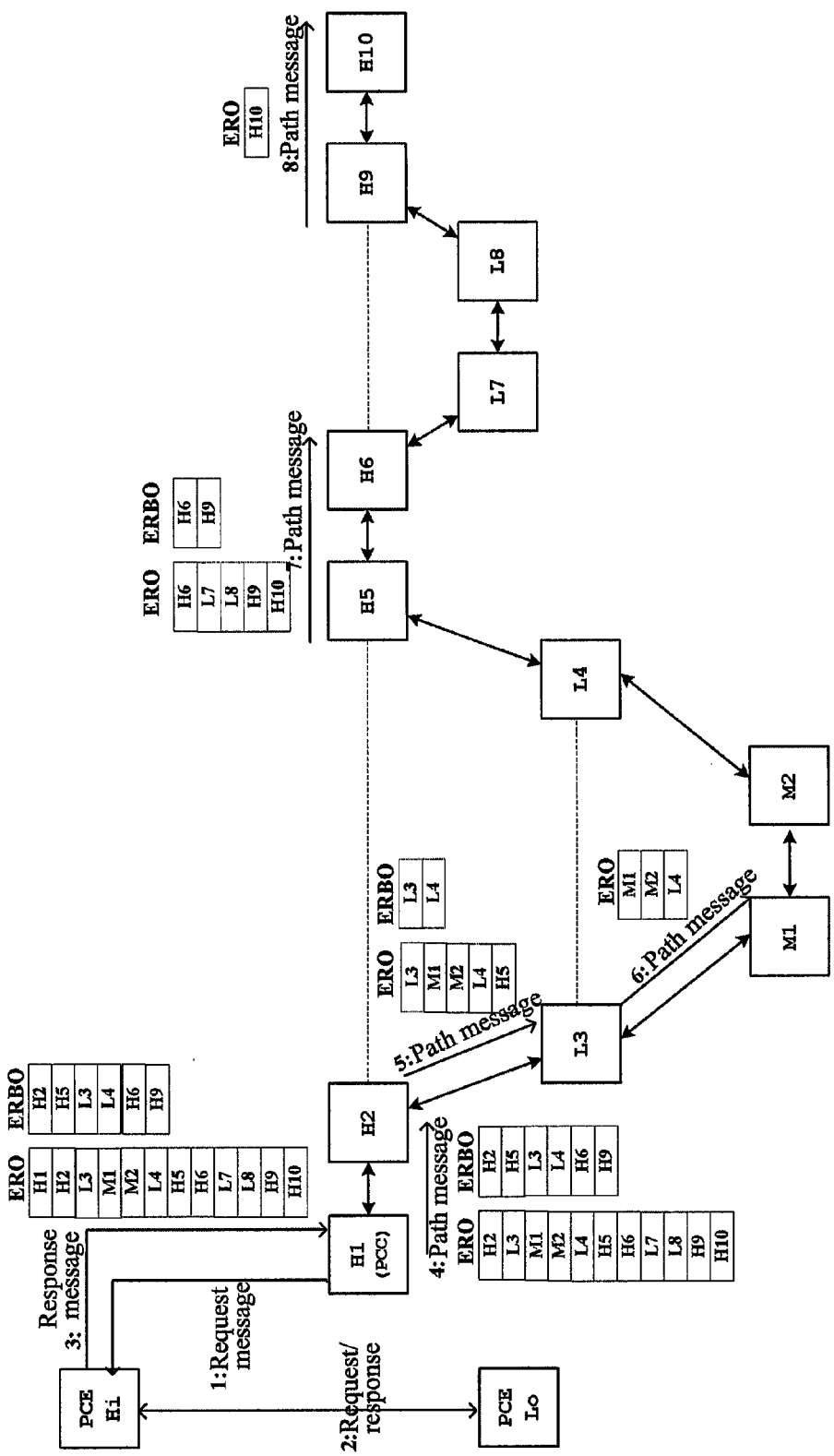
FIG. 3 is a diagram of establishing a connection in a multilayer network in accordance with the second application example of the present invention.

As shown in FIG. 3, in the architecture of multiple PCEs which communicate with each other, the specific implementation steps for establishing a connection in the multilayer network are as follows:

(1) the H1 requests the high-layer PCE Ho to compute a multilayer network route between the H1 and the H10. Since the PCE Ho does not have the low-layer network route information, it requests the PCE Lo which is responsible for computing the low-layer network route to compute the low-layer network routes between the H2 and the H5, as well as the H6 and the H9; after the PCE Lo computes the route successful, the low-layer network route information is returned back to the PCE Ho. After the PCE Ho computes the route successfully, it returns ERO={H1, H2, L3, M1, M2, L4, H5, H6, L7, L8, H9, H10} and ERBO={H2, H5, L3, L4, H6, H9} to the H1.

(2) the HI sends Path message to the H2, the Path message carries ERO={H2, L3, M1, M2, L4, H5, H6, L7, L8, H9, H10} and ERBO={H2, H5, L3, L4, H6, H9}

(3) after the H2 receives the Path message, the H2 determines that the local node is the starting point, i.e. the first node, on the area boundary according to the ERO object and the ERBO object, meanwhile, the end node on the area boundary is the H5, the extracted low-layer network route information is H2, L3, M1, M2, L4 and H5; the extracted low-layer network layer boundary information is the L3 and the L4.

(4) the H2 sends the Path message to the L3, the Path message carries ERO={L3, M1, M2, L4, H5} and ERBO={L3, L4}.

(5) after the L3 receives the Path message, it determines that the local node is a starting point on the area boundary according to the ERO object and the ERBO object, meanwhile, the end node of the area boundary is L4, the extracted low-layer network route information is L3, M1, M2 and L4; the extracted low-layer network layer boundary information is empty. The L3 initiates the process of establishing the low-layer network connection.

(6) the L3 sends Path message to the M1, and the Path message carries ERO={M1, M2, L4}.

(7) after the low-layer network connection between the L3 and the L4 is established successfully, the L3 continues to send the Path message to the L4, and the Path message carries ERO={L4, H5}.

(8) after the low-layer network connection between the H2 and the H5 is established successfully, the H2 continues to send the Path message to the H5, and the Path message carries the ERO={H5, H6, L7, L8, H9, H10} and ERBO={H6, H9}.

(9) the H5 sends Path message to the L6, and the Path message carries ERO={H6, L7, L8, H9, H10} and ERBO={H6, H9}.

(10) after the H6 receives the Path message, it determines that the local node is the starting point, i.e. the first node, on the area boundary according to the ERO object and the ERBO object, meanwhile, the end node on the area boundary is H9, the extracted low-layer network route information is H6, L7, L8 and H9; the extracted low-layer network layer boundary information is empty.

(11) the H6 initiates a process of establishing the low-layer network connection, carrying the ERO={H6, L7, L8 and H9}.

(12) when the low-level network connection between the H6 and the H9 is established successfully, the H6 continues the process of establishing the network connection in this layer.

The Third Application Example

Figure 4:
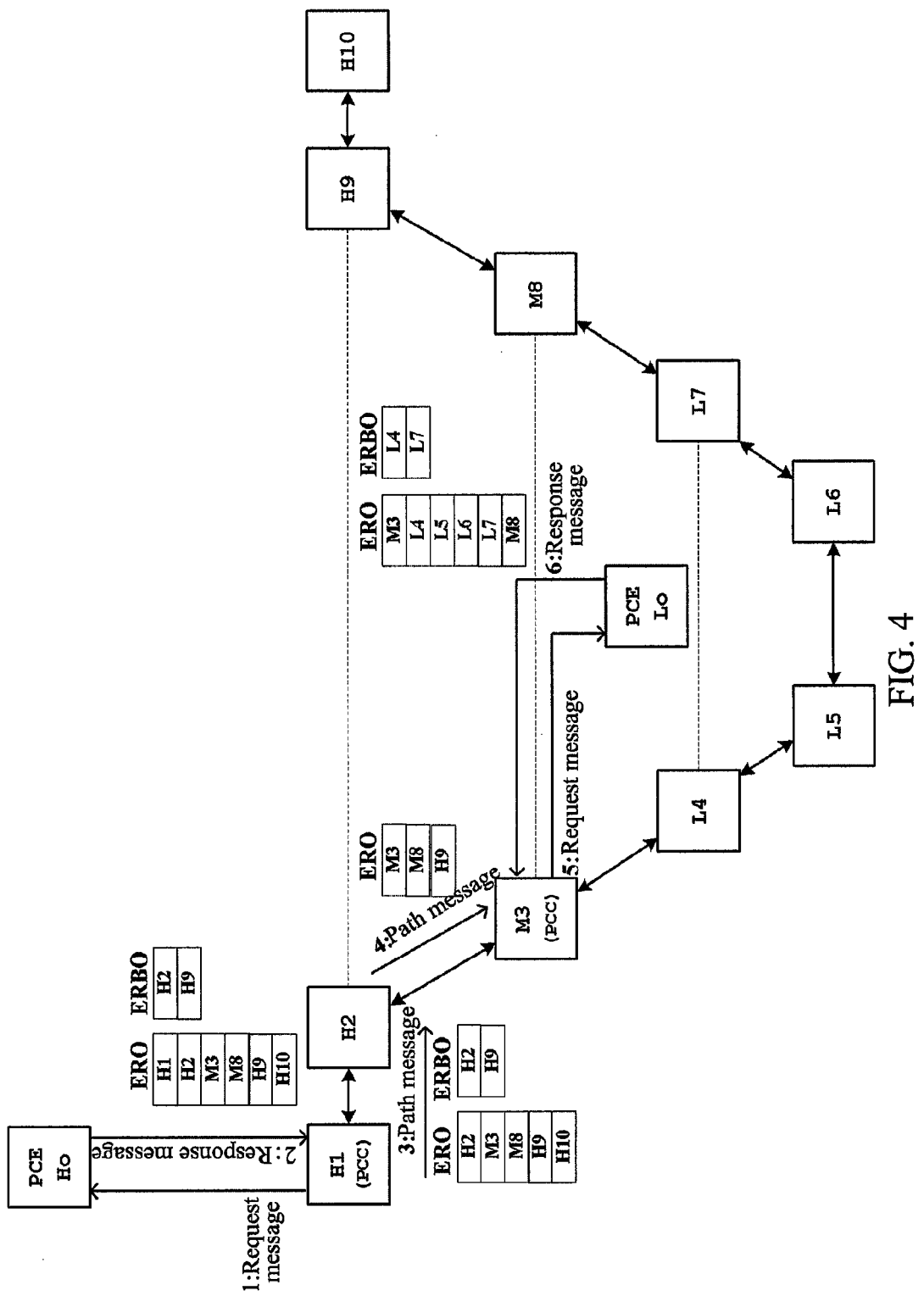
FIG. 4 is a diagram of establishing a connection in a multilayer network in accordance with the third application example of the present invention.

As shown in FIG. 4, in the architecture of multiple PCEs which do not communicate with each other, the PCE Ho is responsible for route computation of the top two layers (defined as the layer 1 and the layer 2), and the PCE Lo is responsible for the lower two layers (defined as the layer 3 and the layer 4). The specific implementation steps for establishing a connection in the multilayer network are as follows:

(1) the H1 sends a request to a high-layer PCE to request to compute a multilayer network routing between the H1 and the H10. Since the PCE Ho is unable to communicate with the PCE Lo, the PCE Ho can only return the ERO={H1, H2, M3 M8, H9, H10} and the ERBO={H2, H9}.

(2) after the H1 receives the PCE Ho response, it sends Path message to the H2, and the Path message carries ERO={H2, M3, M8, H9, H10} and ERBO={H2, H9}.

(3) after the H2 receives the Path message, it determines that this node is the starting point, i.e. the first node, on the area boundary according to the ERO object and the ERBO object, meanwhile the end node on the area boundary is the H9, the extracted low-layer network routing information is the H2, M3, M8 and H9; and the extracted layer boundary information of the low-layer network is empty. The H2 initiates a process of establishing the low-layer network connection.

(4) the H2 sends the Path message to the M3, and the Path message carries the ERO={M3, M8, H9} and the ERBO which is empty.

(5) since there is no connection between the M3 and the M8, and the M3 and the PCE Lo can communicate with each other, and M3 knows that the PCE Lo has inter-layer computation capability (Note: the prior art has been able to complete this function), the M3 requests the PCE Lo which is responsible for computing the routes of the layer 3 and the layer 4 to compute the low-layer network connection route between the M3 and the M8, the PCE Lo returns the ERO={M3, L4, L5, L6, L7, M8}, and ERBO={L4, L7}.

(6) the M3 sends the Path message to the L4, carrying the ERO={L4, L5, L6, L7, M8} and the ERBO={L4, L7}.

(7) After the L4 receives the Path message, it determines that the local node is the starting point on the area boundary according to the ERO object and the ERBO object, meanwhile the end node on the area boundary is the L7, the extracted low-layer network route information is the L2, L3, L6 and L7; and the extracted layer boundary information of the low-layer network is empty. The L4 initiates the process of establishing the low-layer network connection.

(8) the L4 sends the Path message to the L5, and the Path message carries the ERO={L5 L6, L7} and the ERBO which is empty.

(9) when the low-level network connection between the L4 and the L7 is established successfully, the L4 continues to send the Path message to the L7, and the Path message carries the ERO={L7, M8} and the ERBO which is empty.

(10) when the low-level network connection between the M3 and the M8 is established successfully, the M3 continues to send the Path message to the M8, and the Path message carries the ERO={M8, H9} and the ERBO which is empty.

(11) when the low-level network connection between the H2 and the H9 is established successfully, the H2 continues to send the Path message to the H9, and the Path message carries the ERO={H9, H10} and the ERBO which is empty.

(12) the H9 sends the Path message to the H10, and the Path message carries the ERO={H10} and the ERBO which is empty.

Although the present invention is described with combination of the specific embodiments, for those skilled in the field, the present invention can be modified and changed without departing from the spirit or scope of the present invention. These modifications and changes should be considered within the scopes of the present invention and the appended claims.

INDUSTRIAL APPLICABILITY

The present invention provides a method for controlling area boundary, a method and system for establishing a connection in a multilayer network, with the PCE computing the network path and sending response message carrying the layer boundary information to the PCC, a multilayer network connection can be established quickly, thereby reducing the time for establishing a multi-layer network connection.

What is claimed is:

1. A method for controlling area boundary in a multilayer network, comprising:
   a path computation client (PCC) sending request message for computing a network route to a path computation element (PCE);
   the PCE computing the network path, returning response message to the PCC, wherein the response message carries layer boundary information which comprises information indicating which nodes are area boundary nodes.

2. The method of claim 1, wherein:
   after the step of the PCE returning the response message to the PCC, the method also comprises:
   in a process of the PCC establishing a connection with a peer-end node, the layer boundary information being carried in path message sent by the PCC to an intermediate node, as well as in path message sent between intermediate nodes.

3. The method of claim 1, wherein:
   the layer boundary information comprising the information of one or more pairs of area boundary nodes refers to:
   the layer boundary information comprising information of one or more pairs of area boundary nodes in a same layer, or information of one or more pairs of area boundary nodes in multiple layers.

4. A method for establishing a connection in a multilayer network, comprising:
   a path computation client (PCC) sending request message for computing a network route to a peer-end node to a path computation element (PCE);
   the PCE computing a network path, returning response message to the PCC, wherein the response message carries path information and layer boundary information of the multilayer network;
   according to the path information and the layer boundary information in the received response message, the PCC sending path message to an intermediate node, and,
   according to the path information and the layer boundary information in the received path message, the intermediate node further sending path message to another intermediate node or the peer-end node;
   wherein, the layer boundary information comprises information indicating which nodes are area boundary nodes.

5. The method of claim 4, wherein:
   in the step of the intermediate node further sending the path message to the other intermediate node or the peer-end node according to the received path message,
   if the layer boundary information carried in the path message received by the intermediate node is empty, continuing a process of establishing a network connection in a local layer according to the path information in the path message; if it is not empty, judging whether a first node in the received layer boundary information is a local node or not; if said first node is not the local node, continuing the process of establishing the network connection in the local layer according to the path information in the path message, if said first node is the local node, the local node is a first node on the area boundary, acquiring a second node from the layer boundary information as an end node on the area boundary;
   after determining a pair of area boundary nodes, a first node on the area boundary acquiring path information of a low-layer network between the pair of the area boundary nodes from the received path information, and acquiring layer boundary information of the low-layer network according to the path information of the low-layer network and the received layer boundary information, initiating a process of establishing a low-layer network connection; after the low-layer network connection is established, the first node on the area boundary continuing the process of establishing a network connection in the local layer according to the path information and the layer boundary information in the received path message.

6. The method of claim 5, wherein:
   in the step of the first node on the area boundary acquiring the path information of the low-layer network between the pair of the area boundary nodes from the received path information,
   if the acquired path information is empty, and there is no connection between the area boundary nodes, the first node on the area boundary sending request message for computing a low-layer network route between two area boundary nodes to the PCE which is responsible for computing a low-layer network path;
   the PCE which is responsible for computing the low-level network path computing the network path, returning response message to the first node on the area boundary, wherein the response message carries the path information and the layer boundary information of the low-layer network.

7. The method of claim 4, wherein:
   the layer boundary information comprising the information of one or more pairs of area boundary nodes refers to:
   the layer boundary information comprising information of one or more pairs of area boundary nodes in a same layer, or information of one or more pairs of area boundary nodes in multiple layers.

8. A system for establishing a connection in a multilayer network, comprising a path computation client (PCC), a path computation unit (PCE), one or more intermediate nodes and a peer-end node, wherein:

the PCC is set to send request message for computing a network route to the peer-end node to the PCE, as well as, send path message to the intermediate nodes according to path information and layer boundary information in received response message;

the PCE is set to compute a network path, return response message to the PCC, wherein the response message carries the path information and the layer boundary information of the multilayer network;

the intermediate nodes are set to further send the path message to other intermediate nodes or the peer end node according to the path information and the layer boundary information in the received path message;

wherein, the layer boundary information comprises information of one or more pairs of area boundary nodes.

9. The system of claim 8, wherein:

the intermediate nodes are further set to judge whether the layer boundary information in the received path message is empty or not, if empty, continue a process of establishing a network connection in a local layer according to the path information in the path message; if not empty, judge whether a first node in the received layer boundary information is a local node or not; if said first node is not the local node, continue the process of establishing the network connection in the local layer according to the path information in the path message, if said first node is the local node, with the local node being a first node on the area boundary, acquire a second node from the layer boundary information as an end node on the area boundary, after determining a pair of area boundary nodes, acquire path information of a low-layer network between the pair of area boundary nodes from the received path information, and acquire layer boundary information of the low-layer network according to the path information of the low-layer network and the received layer boundary information, and initiate a process of establishing a low-layer network connection; after the low-layer network connection is established, continue the process of establishing a network connection in the local layer according to the path information and the layer boundary information in the received path message.

10. The system of claim 9, wherein:

the intermediate nodes are further set to: when acquiring the path information of the low-layer network between the pair of area boundary nodes from the received path information, if the acquired path information is empty and there is no connection between the area boundary nodes, send request message for computing a low layer network route between two area boundary nodes to the PCE which is responsible for computing a low layer network path; and initiate a low-layer network connection establishment process according to the path information and the layer boundary information of the low-layer network in the response message received by the PCE which is responsible for computing the low-layer network path.

11. A path computation element (PCE) for supporting connection establishment in a multilayer network, comprising a receiving module, a computing module and a transmitting module that are cascaded;

said receiving module is set to receive request message for computing a network route sent by a path computation client (PCC);

the computing module is set to compute a network path according to the request message received by the receiving module, and generate response message; wherein the response message carries layer boundary information, and the layer boundary information comprises information of one or more pairs of area boundary nodes;

the transmitting module is set to return the response message generated by the computing module to the PCC.

12. The method of claim 2, wherein:

the layer boundary information comprising the information of one or more pairs of area boundary nodes refers to:

the layer boundary information comprising information of one or more pairs of area boundary nodes in a same layer, or information of one or more pairs of area boundary nodes in multiple layers.

13. The method of claim 5, wherein:

the layer boundary information comprising the information of one or more pairs of area boundary nodes refers to:

the layer boundary information comprising information of one or more pairs of area boundary nodes in a same layer, or information of one or more pairs of area boundary nodes in multiple layers.

14. The method of claim 6, wherein:

the layer boundary information comprising the information of one or more pairs of area boundary nodes refers to:

the layer boundary information comprising information of one or more pairs of area boundary nodes in a same layer, or information of one or more pairs of area boundary nodes in multiple layers.

* * * * *